US012760700B2

(12) United States Patent
Cooke

(10) Patent No.: US 12,760,700 B2
(45) Date of Patent: Oct. 13, 2026

(54) FUEL INJECTOR

(71) Applicant: PHINIA DELPHI LUXEMBOURG SARL, Belvaux (LU)

(72) Inventor: Michael Peter Cooke, Kent (GB)

(73) Assignee: PHINIA DELPHI LUXEMBOURG SARL, Belvaux (LU)

( * ) Notice: Subject to any disclaimer, the term of this patent is extended or adjusted under 35 U.S.C. 154(b) by 222 days.

(21) Appl. No.: 18/844,734

(22) PCT Filed: Mar. 8, 2023

(86) PCT No.: PCT/EP2023/055921
§ 371 (c)(1),
(2) Date: Sep. 6, 2024

(87) PCT Pub. No.: WO2023/170168
PCT Pub. Date: Sep. 14, 2023

(65) Prior Publication Data

US 2025/0188898 A1 Jun. 12, 2025

(30) Foreign Application Priority Data

Mar. 8, 2022 (GB) ..................................... 2203189

(51) Int. Cl.
*F02M 61/10* (2006.01)
*F02M 21/02* (2006.01)
(Continued)

(52) U.S. Cl.
CPC ........ *F02M 61/10* (2013.01); *F02M 21/0257* (2013.01); *F02M 21/0263* (2013.01);
(Continued)

(58) Field of Classification Search
CPC ...... F02M 61/10; F02M 61/18; F02M 61/182; F02M 61/1886; F02M 21/0257;
(Continued)

(56) References Cited

U.S. PATENT DOCUMENTS 7,134,615 B2 * 11/2006 Lawrence ............ F02M 61/182
239/584
7,559,488 B2 * 7/2009 Smout .................. F02M 61/042
239/584
(Continued)

FOREIGN PATENT DOCUMENTS

EP 1063417 A1 12/2000
EP 2060774 A1 5/2009
(Continued)

OTHER PUBLICATIONS

International Search Report for PCT/EP2023/055921 dated Jun. 7, 2023, 4 pages.
(Continued)

*Primary Examiner* — Steven J Ganey
(74) *Attorney, Agent, or Firm* — WARNER NORCROSS + JUDD LLP

(57) ABSTRACT

An injection nozzle for an internal combustion engine, comprising a nozzle body defining a nozzle body bore, a blind end region of which defines a set of nozzle outlets. An injection valve needle is slidably received in the nozzle body bore and engageable with a seating arrangement to control fuel flow. The seating arrangement includes a seating insert received in the nozzle body bore and positioned upstream of the nozzle outlets, the seating insert defining an upper valve seat. The injection valve needle comprises a first seating portion and a second seating portion which are axially spaced along the injection valve needle. The first seating portion is engageable with the upper valve seat defined by the seating insert; and the second seating portion is engageable with a lower valve seat defined by the nozzle body bore.

15 Claims, 5 Drawing Sheets

(51) Int. Cl.
*F02M 51/06* (2006.01)
*F02M 61/18* (2006.01)

(52) U.S. Cl.
CPC .......... *F02M 51/061* (2013.01); *F02M 61/18* (2013.01); *F02M 61/1886* (2013.01)

(58) Field of Classification Search
CPC ............. F02M 21/0263; F02M 51/061; F02M 51/0671; F02M 51/0653
USPC .......... 239/88–96, 533.2–533.12, 584–585.5
See application file for complete search history.

(56) References Cited

U.S. PATENT DOCUMENTS

2002/0079388 A1* 6/2002 Tian ....................... F02M 61/08
239/585.4
2002/0092929 A1 7/2002 Arimoto
2006/0060675 A1* 3/2006 Cooke .................. F02M 45/086
239/88
2006/0157594 A1* 7/2006 Cooke .................. F02M 45/086
239/533.2

FOREIGN PATENT DOCUMENTS

EP 2273097 A1 1/2011
EP 2428672 A2 3/2012
JP 2017057785 A 3/2017

OTHER PUBLICATIONS

Machine assisted English translation of EP2428672A2 obtained from https://patents.google.com/patent on Sep. 4, 2024, 6 pages.
Machine assisted English translation of JP2017057785A obtained from <https://patents.google.com/patent> on Sep. 4, 2024, 14 pages.

* cited by examiner

FUEL INJECTOR

CROSS-REFERENCE TO RELATED APPLICATIONS

This application is the U.S. National Stage of International Application No. PCT/EP2023/055921 filed on 8 Mar. 2023, which claims priority to and all advantages of United Kingdom Application No. 2203189.2 filed on 8 Mar. 2022, the contents of which are incorporated herein by reference.

TECHNICAL FIELD

This invention relates to the technical field of fuel injectors, and in particular to the field of injection nozzles for gaseous-fueled internal combustion engines.

TECHNICAL BACKGROUND

Internal combustions engines, as well as associated componentry such as fuel injectors, are a well-known and mature technological field. These internal combustion engines typically use combustion of petrol or diesel to deliver motive power to a vehicle. However, in the wake of increased consumer interest in alternative fueling solutions for motor vehicles and the like, and ever-stronger regulation against emissions from petrol or diesel engines, there has recently been an increased interest in pursuing and developing internal combustion engines that utilise gaseous fuels, such as hydrogen.

Fuel injectors control delivery of pressurised fuel into the internal combustion engine. Fuel exits the fuel injectors via small outlets as a fine mist so that it may undergo efficient combustion. Delivery is controlled by the presence of an injection valve needle, which selectively blocks or allows passage of fuel to the outlets for injection into the engine.

The unique characteristics of gases such as hydrogen as a fuel can create or exacerbate design challenges with fuel injectors such that conventional fuel injectors are in general not suitable to inject gaseous fuels in an optimum manner. This has led to a need to adapt current fuel injector technologies in order to be effective in gaseous and hydrogen-based internal combustion engines.

It is against this background that the invention has been devised.

SUMMARY OF THE INVENTION

Examples of the invention provide an injection nozzle for an internal combustion engine, comprising a nozzle body defining a nozzle body bore, a blind end region of which defines a set of nozzle outlets; an injection valve needle slidable in the nozzle body bore and engageable with a seating arrangement to control fuel flow through the set of nozzle outlets; wherein the seating arrangement includes a seating insert received in the nozzle body bore and positioned upstream of the nozzle outlets, the seating insert defining an upper valve seat. The injection valve needle comprises a first seating portion and a second seating portion which are axially spaced along the injection valve needle. The first seating portion is engageable with the upper valve seat defined by the seating insert; and the second seating portion is engageable with a lower valve seat defined by the nozzle body bore. The seating insert defines at least in part a first flow path for fuel to travel from the upper seating surface to the set of nozzle outlets, when the first seating portion is disengaged therefrom to commence a fuel injection event.

The injection nozzle according to the invention provides several advantages over the prior art. In particular, the provision of the seating insert as part of the seating arrangement means that the diameter of the upper valve seat can be reduced so that it is almost identical to that of the lower valve seat. In practice, the diameters of the upper valve seat and the lower valve seat may differ by at most 20%, preferably by at most 15% and more preferably by at most 10%. Typically, the upper valve seat will still be slightly larger than the lower valve seat, but this may differ based on the construction of the seating insert and the injection valve needle. This reduces the differential area between the two valve seats thereby reducing the load required to seat the injection valve needle when the fuel pressure is lower than the cylinder pressure. This minimises the required size of the return spring. In addition, as the return spring only provides a small seating load, the force required to lift the injection valve needle against the action of the return spring is also minimised. This enables a smaller solenoid to be used to provide the lift to the injection valve needle. The result is a more efficient and effective injector for gaseous fuels which has a low needled lift but retains a high flow rate.

Preferred and/or optional features are set out in the appended dependent claims.

BRIEF DESCRIPTION OF THE FIGURES

So that it May be More Readily Understood, the Invention Will Now be Described with Reference to the Following Set of Figures, in which.

DETAILED DESCRIPTION

Figure 1:
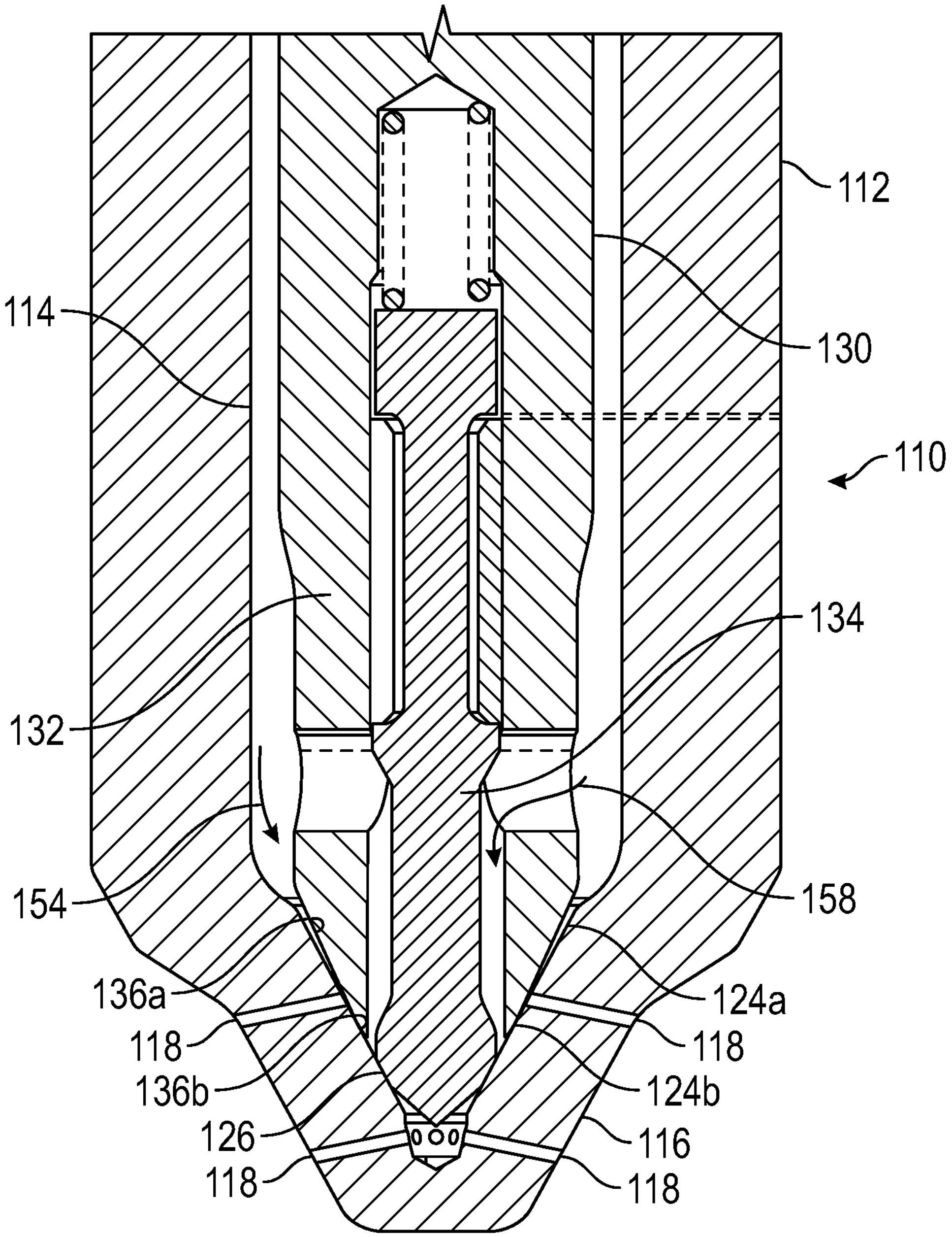
FIG. 1 (Prior Art)
FIG. 1 shows an injection nozzle of a fuel injector as according to the state of the art.

FIG. 1 shows a known injection nozzle 110 for a fuel injector which comprises a nozzle body 112 defining a blind nozzle body bore 114. A series of nozzle outlets 118 are defined at a blind end region 116 of the nozzle body bore 114, passing through the nozzle body 112 to enable fluid communication between the nozzle body bore 114 and the environment external to the fuel injector, such as a combustion chamber of an internal combustion engine.

An injection valve needle 130 controls the flow of fuel from the nozzle body bore 114 to the nozzle outlets 118 by engaging against valve seats on the inner surface of the nozzle body 112. The injection valve needle 130 comprises a first outer needle part 132 and a second, inner needle part 134. The first needle part comprises two seating ridges **136*a*, 136*b*, which are spaced from one another along the axis of the injection nozzle 110 and which engage with first and second valve seats 124*a*, 124*b*, respectively. The first and second valve seats 124*a*, 124*b* are accordingly also axially spaced from one another along the axis of the injection nozzle 110. The second needle part 134 engages with a third valve seat 126, located axially below the first and second valve seats 124***a*, 124*b*. A first level of nozzle outlets 118 is positioned in between the first and second valve seats 124*a*, 124*b*, while a second level of nozzle outlets 118 is positioned axially below the third valve seat 126.

As a result of the axial spacing therebetween, the first valve seat 124*a* has a larger diameter than the second valve seat 124*b*, which in turn has a larger diameter than the third valve seat 126 on account of the conical shape of the interior surface of the nozzle body 112 at the blind end region 116. When the first and second needle parts 132, 134 are engaged with the respective valve seats 124*a*, 124*b*, 126, no fuel can flow from the nozzle body bore 114 to the nozzle outlets 118. If on the other hand, either the first or second seating ridges 136*a*, 136*b* of the first needle part 132 or the second needle part are not engaged with their respective valve seats 124*a*, 124*b*, 126, fuel can flow along an outer flow path 154 and/or an inner flow path 158 to reach the nozzle outlets 118 and so exit the fuel injector and flow into a combustion chamber of the engine.

Valve needle arrangements such as that shown in FIG. 1 are advantageous as they allow fuel to flow to the nozzle outlets 118 from both above and below the outlets 118 themselves. This can give a high total flow area whilst reducing the force needed to lift the injection valve needle 130 and also the distance that the injection valve needle 130 needs to be lifted.

However, use of injection nozzles 110 following the design of FIG. 1 is not suitable for internal combustion engines using hydrogen or other gaseous fuels.

In fuel injectors employing multiple seats for the injection valve needle, the seating load required by the injection valve needle is defined by the product of the differential area between the areas of the two seats and the differential pressure between the pressure of the fuel contained in the fuel injector and the pressure of gas in the combustion chamber of the internal combustion engine (cylinder pressure). This does not present a problem for fuel injectors in conventional internal combustion engines as the fuel pressure, which is often around 2000 bar is typically significantly higher than the cylinder pressure and so the differential pressure is positive and acts to assist with seating the injection valve needle.

However, in hydrogen or gaseous-fueled internal combustion, the fuel pressure inside the fuel injector is typically much lower, at a maximum of around 350 bar. The fuel pressure can therefore be lower than the cylinder pressure, especially towards the end of a fueling cycle, when the fuel pressure can drop as low as 50 bar. The large negative differential pressure that this creates causes a need for a significant seating force to be applied to the injection valve needle to keep it seated and prevent leakage of fuel out of the nozzle outlets. Any leakage of fuel is a particularly severe issue for gaseous fuels as their lower viscosity results in higher flow of fuel past the partially open valve seat and their lower density necessitates the use of larger nozzle outlets.

The fuel injector can also suffer from leakage if the two seating ridges 136*a*, 136*b* on the first needle part 132 or, equivalently, the first and second valve seats 124*a*, 124*b* wear by different amounts. Wear of the seating ridges 136*a*, 136*b* and the first and second valve seats 124*a*, 124*b* occurs due to the repeated opening and closing of the seating ridges 136*a*, 136*b* against their respective valve seats 124*a*, 124*b*. If some differential wear has occurred between these components, when the less worn of the seating ridges 136*a*, 136*b* is engaged with its respective valve seat 124*a*, 124*b*, the other, more worn seating ridge cannot fully engage with its valve seat and so the injection valve needle 130 cannot prevent flow of fuel to the nozzle outlets 118. In this scenario, the engagement of one of the seating ridges 136*a*, 136*b* with its valve seat 124*a*, 124*b* effectively holds the other seating ridge/valve seat pair partially open.

Figure 2:
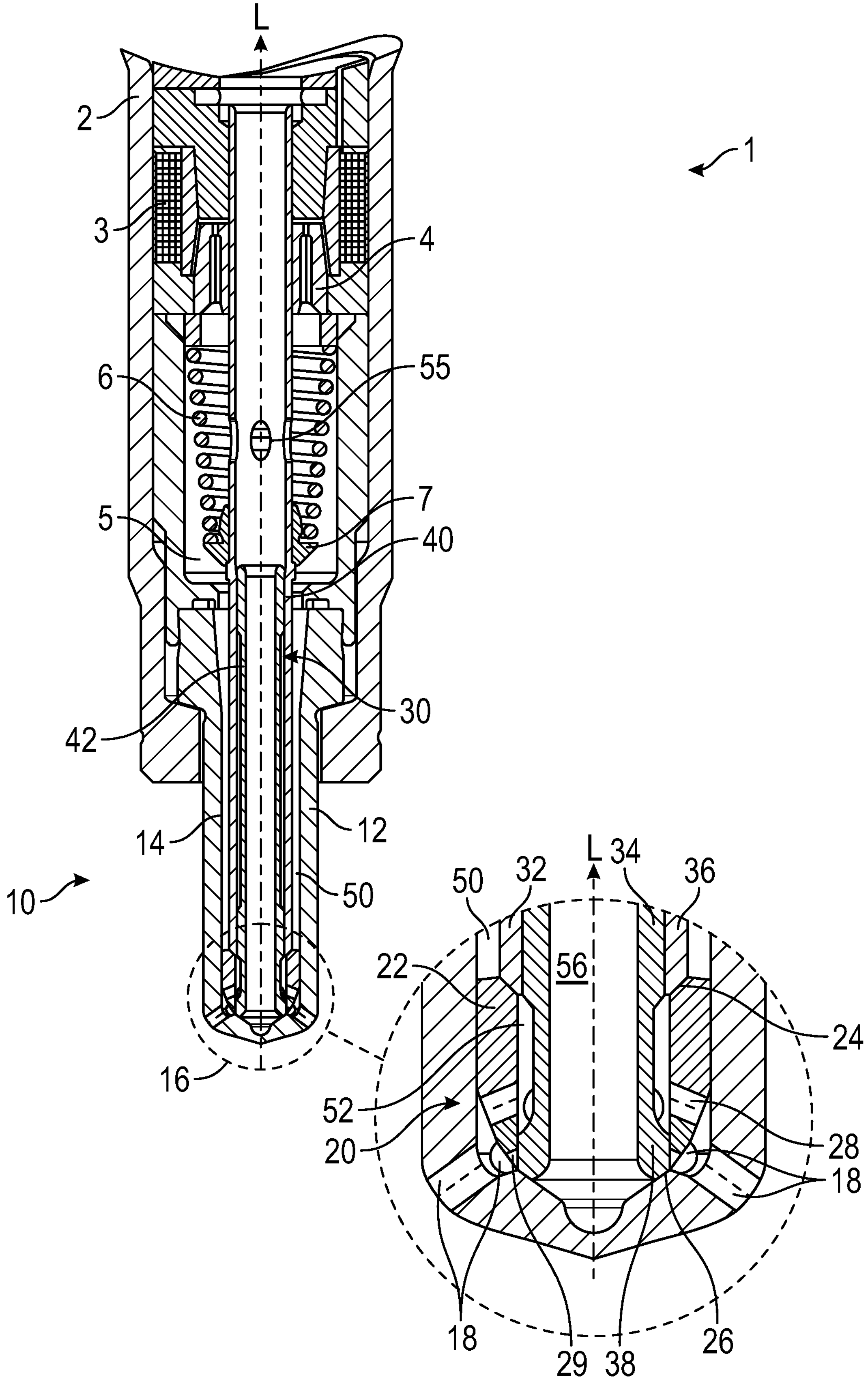
FIG. 2 is a cross-sectional view of a fuel injector comprising an injection nozzle according to the invention in a closed position.
Figure 3:
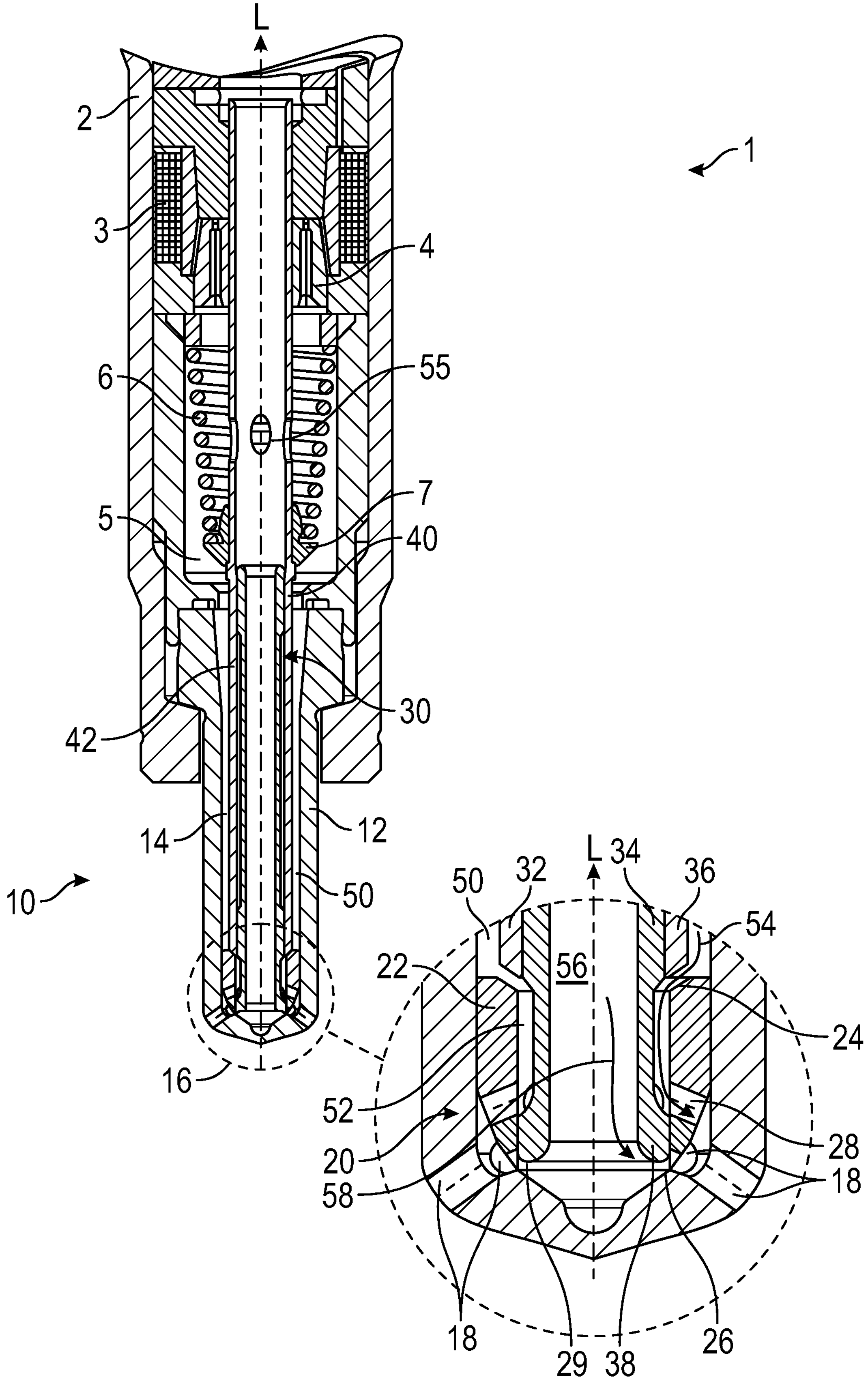
FIG. 3 shows the fuel injector and injection nozzle of FIG. 1 in an open position.

With these considerations in mind, FIGS. 2 and 3 show a first embodiment of a fuel injector 1 for an internal combustion engine, which extends along a longitudinal axis L. The fuel injector 1 comprises a substantially cylindrical injection nozzle 10 received within a substantially cylindrical housing 2 of the fuel injector 1. The injection nozzle 10 comprises a nozzle body 12 defining a blind nozzle body bore 14 therethrough. A blind end region 16 of the nozzle body 12 further defines a set of nozzle outlets 18 which comprise passages through the walls of the nozzle body 12 to enable fluid communication between the nozzle body bore 14 and the environment external to the injection nozzle 10.

In general, the fuel injector 1 further comprises a seating arrangement 20 received within the nozzle body bore 14 towards the blind end region 16 thereof. The fuel injector 1 further comprises an injection valve needle 30 received within the housing 2, extending into the nozzle body bore 14 and seated against the seating arrangement 20. Seating of the injection valve needle 30 against the seating arrangement 20 prevents fuel flowing out of the nozzle outlets 18. The injection valve needle 30 carries a return collar 7, which is engaged with a return spring 6 housed within a fuel volume 5 of the housing 2 axially above the injection nozzle 10 with respect to the axis L as shown in the Figures. The fuel volume 5 is in fluid communication with the nozzle body bore 14.

The fuel injector also comprises an actuator arrangement for actuating the injection valve needle 30. The actuator arrangement includes an armature 4 and a solenoid 3. The armature 4 surrounds the injection valve needle 30 at an upper end of the housing 2 with respect to the axis L. The solenoid 3 is received within the housing 2 at an upper end thereof. The solenoid 3 is located radially outboard of the armature 4 and is at least partially axially aligned with the armature so that the armature 4 is at least partially surrounded by the solenoid 3.

Considering the seating arrangement 20 in greater detail, FIGS. 2 and 3 show that the seating arrangement 20 comprises an annular seating insert 22 received within the nozzle body bore 14 upstream of the nozzle outlets 18. The outer diameter of the seating insert 22 substantially matches the diameter of the nozzle body bore 14 in the blind end region 16 so that the nozzle body bore 14 holds the seating insert 22 in place via a suitably tight fit therewith. The diameter of the nozzle body bore 14 may be slightly smaller at the blind end region 16 than in the rest of the nozzle body bore 14 to aid correct positioning of the seating insert 20 by localising the axial extent of the tight-fitting region, while the seating insert 22 may also have a tapering leading edge region, as shown in the Figures, to ease insertion of the seating insert 22 into the nozzle body bore 14.

The seating insert 22 does not extend to the bottom of the blind end region 16, instead leaving a clearance 29 underneath. The seating insert 22 also comprises a series of ducts 28 that pass through the seating insert 22. When the seating insert 22 is installed in the nozzle body bore 14, the seating ducts 28 are located proximal to the nozzle outlets 18. Both the bottom clearance 29 and the ducts 28 enable fluid communication between the nozzle body bore 14 and the nozzle outlets 18, as will be described in more detail below.

The injection valve needle 30 is formed of two parts: a first, outer needle part 32 and a second, inner needle part 34 received within the first needle part 32. Both the first and second needle parts 32, 34 are substantially tubular and together define an interior volume 56 of the injection valve needle 30. The outer diameter of the first needle part 32 is less than the diameter of the nozzle body bore 14 such that the injection valve needle 30 is slidable in the nozzle body bore 14 and an outer clearance 50 is defined between the injection valve needle and the wall of the nozzle body bore 14. The outer diameter of the second needle part 34 substantially matches the inner diameter of the first needle part 32 along the length of the second needle part 34, except for at a central section of the second needle part 34, where a radially outward facing surface of the second needle part 34 is recessed, defining a valve needle clearance 42 between the first and second needle parts 32, 34.

As shown in FIGS. 2 and 3, the first needle part 32 extends a significant way into the housing 2 of the fuel injector 1 and is the part of the injection valve needle 30 that is directly coupled with the armature 4. A series of holes 55 in the first needle part 32 at the level of the return spring 6 enables fluid communication between the fuel volume 5 and the interior volume 56 of the injection valve needle 30. The second needle part 34, in contrast, only extends a short way into the housing 2. To couple the movement of the first and second needle parts 32, 34, they are sealed together at a sealing region 40 located towards the end of the second needle part 34 received within the housing 2, just below the return spring 6 and return collar 7. In other words, the sealing region 40 is remote from the blind end region 16 and the seating arrangement 20. The sealing at the sealing region 40 may be made using any suitable process, such as welding, brazing, soldering, use of an adhesive, use of an interference fit, or a combination of two or more of these techniques.

Just as the first and second needle parts 32, 34 extend different distances into the housing 2, the needle parts 32, 34 also extend different distances into the nozzle body bore. The first needle part 32 engages with an upper valve seat 24 defined on an upper surface of the seating insert 22 to create a first seal, while the second needle part 34 forms a similar, second seal by engagement with a lower valve seat 26 defined by a conical end surface at the blind end of the nozzle body bore 14. References to 'upper' and 'lower' here are made with respect to the axis L of the fuel injector 1 and the orientation of the fuel injector 1 shown in the Figures. The portions of the first and second needle parts 32, 34 towards the blind end region 16 therefore form respective first and second seating portions 36, 38 for creating the first and second seals with the upper and lower valve seats 24, 26, respectively.

As a result of the different lengthwise extents of the first and second needle parts 32, 34 within the nozzle body bore 14, the first and second seating portions 36, 38 are axially spaced along the injection valve needle 30. As can be seen in FIGS. 2 to 5, and especially in FIGS. 2 and 3, the first seating portion 36 and the upper valve seat 24 are located above the nozzle outlets 18, while the second seating portion 38 and the lower valve seat 26 are located below the nozzle outlets 18.

In addition to the recess in the radially outward facing surface of the second needle part 34 that defines the valve needle clearance 42, the radially outward facing surface of the second needle part 34 also comprises a recess just underneath the first seating portion 36 and the upper valve seat 24 that defines an annular flow channel 52 between the radially inward facing surface of the seating insert 22 and the radially outward facing surface of the second needle part 34. The flow channel 52 is therefore in fluid communication with the seating insert ducts 28 and also the nozzle outlets 18.

Pressurised fuel is present in the fuel injector 1 in the fuel volume 5. It can therefore flow into the outer clearance 50 and the interior volume 56 of the injection valve needle 30 via the holes 55.

FIG. 2 shows the fuel injector 1 in a closed position, with the first and second seating portions 36, 38 of the injection valve needle 30 engaged against the upper and lower valve seats 24, 26 to create the first and second seals under the action of the return spring 6, acting against the return collar 7. The first seal prevents pressurised fuel held within the outer clearance 50 from entering the nozzle outlets 18, while the second seal provides the same function against pressurised fuel held within the interior volume 56.

FIG. 3, on the other hand, shows the fuel injector 1 in an open position during a fuel injection event. The fuel injector 1 is moved to the open position from the closed position to commence the fuel injection event by the application of an electric current through a solenoid 3, which generates a magnetic field that acts on the armature 4, causing it to move upwards. The direct coupling of the armature 4 to the first needle part 32, in combination with the fixing of the first and second needle parts 32, 34 at the sealing region 40 translates this upwards motion to the injection valve needle 30 and causes the first and second seating portions 36, 38 to disengage from the upper and lower valve seats 24, 26, respectively and move upwards against the action of the return spring 6.

The lifting of the first seating portion 36 from the upper valve seat 24 creates a first, outer flow path 54 comprising the outer clearance 50, the flow channel 52 and the ducts 28, which enables pressurised fuel to flow from the fuel volume 5, around the outside of the injection valve needle 30, to the nozzle outlets 18 and out of the fuel injector 1.

In a similar way, the lifting of the second seating portion 38 from the lower valve seat 26 creates a second, inner flow path 58 comprising the interior volume 56 of the injection valve needle 30 and the bottom clearance 29, which enables pressurised fuel to flow from the fuel volume 5, through the interior volume 56 of the injection valve needle 30, to the nozzle outlets 18 and out of the fuel injector 1.

By providing the first and second flow paths 54, 58, all the space in the nozzle body bore 14 except for that occupied by the injection valve needle 30 and seating arrangement 20 can be usefully used for fuel to flow out of the injection nozzle 10.

Once sufficient fuel has been delivered from the fuel injector 1 out of the nozzle outlets 18, the supply of electric current to the solenoid 3 is stopped, causing the injection valve needle 30 to return to engagement with the upper and lower valve seats 24, 26 under the action of the return spring 6 and enabling the fuel injector 1 to resume the closed position and terminate that injection event.

In this way, the delivery of pressurised fuel from the fuel injector 1 through the nozzle outlets 18 to an internal combustion engine can be controlled by selectively applying electric current through the solenoid 3 to cause the fuel injector 1 to move between the open and closed positions by lifting the injection valve needle 30 away from engagement with the upper and lower valve seats 24, 26.

It should be noted that, when the fuel injector 1 is in position in the internal combustion engine, regions of the fuel injector 1 in fluid communication with the engine are connected to the pressure. Therefore, the nozzle outlets 18, the ducts 28 and the flow channel 52 are connected to the cylinder pressure whether the fuel injector 1 is in the open position or the closed position. The valve needle clearance 42 is also connected to the cylinder pressure as there is no sealing between the first and second needle parts 32, 34 below the sealing region 40. The pressurised fuel is typically at a different pressure to the engine and so, when the fuel injector 1 is in the closed position, the outer clearance 50 and the injection valve needle interior 56 are subjected to the pressure from the pressurised fuel.

The internal structure of the injection nozzle 10 provides several advantages over the prior art. In particular, the provision of the seating insert 22 as part of the seating arrangement 20 enables the diameter of the upper valve seat 24 to be reduced so that it is almost identical to that of the lower valve seat 26. In practice, the diameters of the upper valve seat 24 and the lower valve seat 26 may differ by at most 20%, preferably by at most 15% and more preferably by at most 10%. Typically, the upper valve seat 24 will still be slightly larger than the lower valve seat 26, but this may differ based on the construction of the seating insert 22 and the injection valve needle 30. This reduces the differential area between the two valve seats 24, 26, thereby reducing the load required to seat the injection valve needle 30 when the fuel pressure is lower than the cylinder pressure. This minimises the required size of the return spring 6. In addition, as the return spring 6 only provides a small seating load, the force required to lift the injection valve needle 30 against the action of the return spring 6 is also minimised. This enables a smaller solenoid 3 to be used to provide the lift to the injection valve needle 30.

Furthermore, the provision of two separate flow paths (i.e., the first flow path 54 and the second flow path 58) approximately halves the lift distance required of the first and second needle parts 32, 34 for the same volume of fuel to be provided to the nozzle outlets 18. This therefore further reduces the energy demands on the solenoid 3. In combination with the reduced seating force provided by the return spring 6 as a result of the reduced differential area between the two valve seats 24, 26, this feature enables the use of a much smaller solenoid 3 for a given pressure and flow requirement than in conventional injection nozzles and fuel injectors. This in turn results in increased speed of operation, but also to downstream benefits in material and packaging costs and energy usage.

In addition, the positioning of the sealing region 40 to be remote from the seating arrangement 20, along with the small cross-sectional area of the first and second needle parts 32, 34 enables a degree of differential wear to be tolerated between the first seating portion 36 and the upper valve seat 24 and the lower valve seat 38 and the lower valve seat 26 as a result of the elasticity of the first and second needle parts 32, 34. By providing a greater 'free' length for each needle part 32, 34, any small deformation in either needle part 32, 34 that is required to accommodate any differential wear represents a smaller strain on the needle part 32, 34 in question. Furthermore, the increased elasticity of the needle parts 32, 34 also reduces the wear experienced by providing a mechanism by which the impact load from seating against the respective valve seats 24, 26 can be absorbed. To further ensure that both the first and second seating portions 36, 38 engage with their respective valve seats 24, 26 simultaneously, individual seating loads may be applied to the first and second needle parts 32, 34 in a fixture whilst the needle parts 32, 34 are being joined at the sealing region 40.

Figure 4:
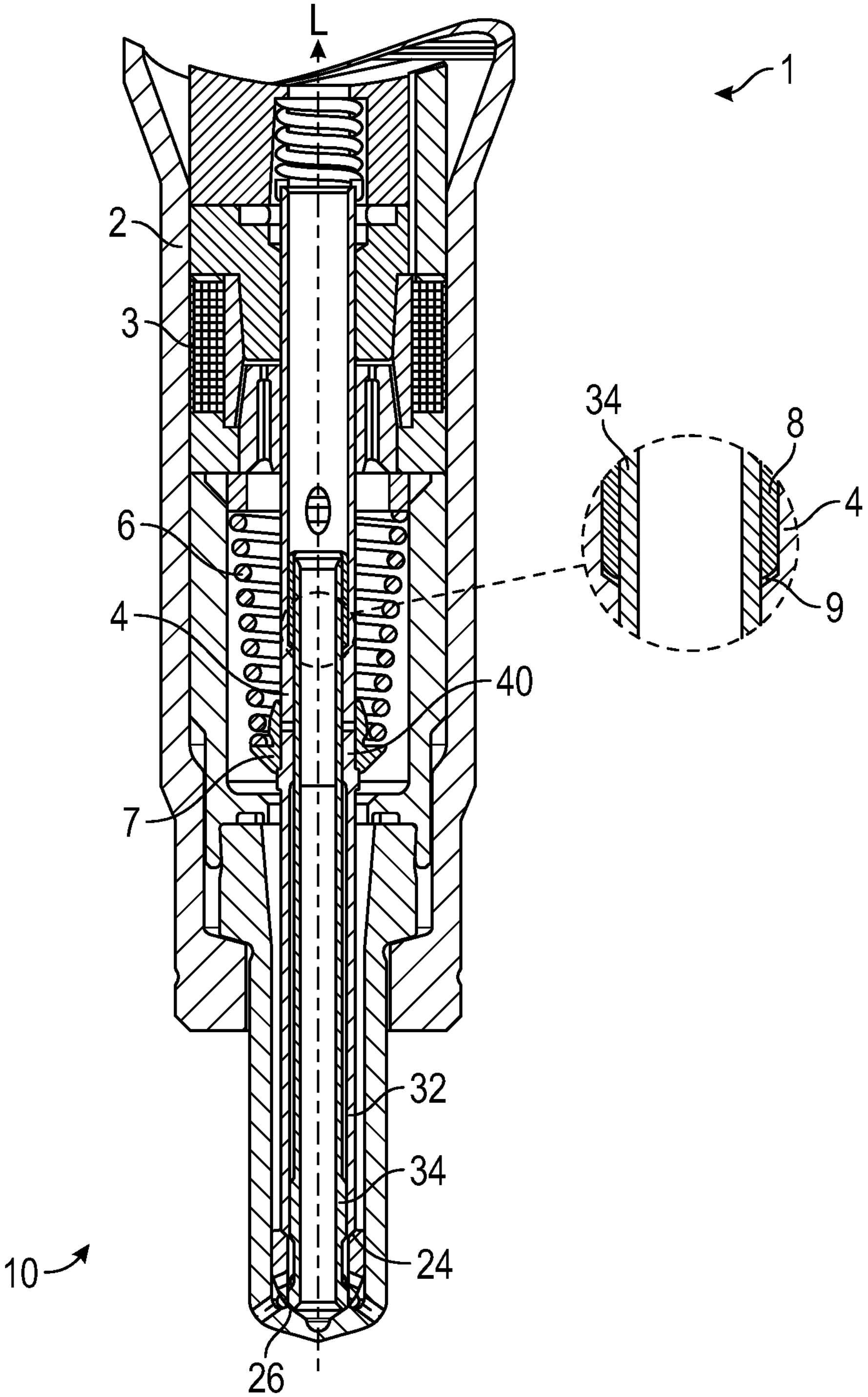
FIG. 4 shows a cross-section view of an alternative fuel injector according to the invention in a closed position.
Figure 5:
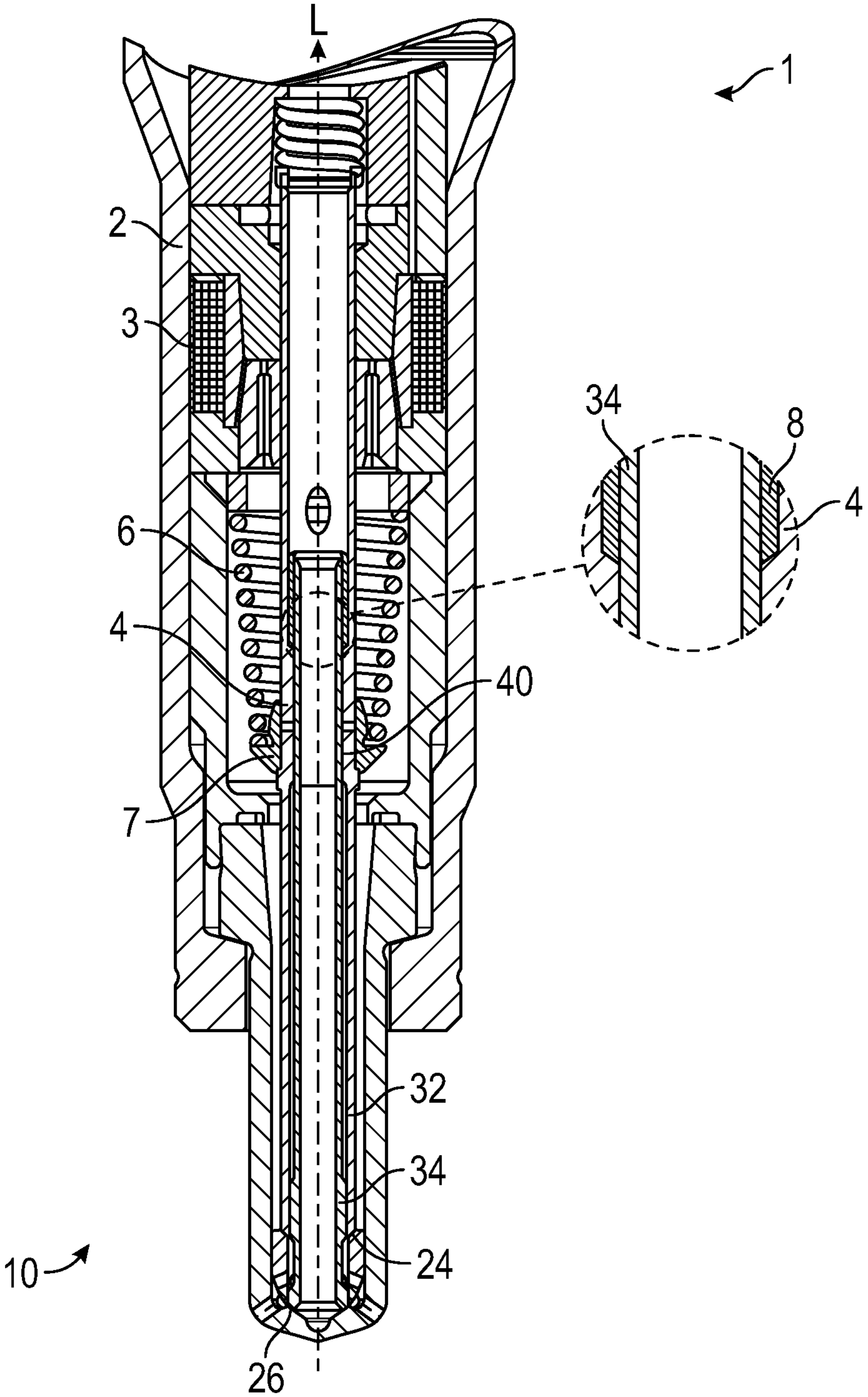
FIG. 5 shows the fuel injector of FIG. 3 in an open position.

FIGS. 4 and 5 show a second embodiment of the invention, in which like features are referred to using like reference numbers. As with the first embodiment, the fuel injector 1 is first shown in a closed position in FIG. 4, while FIG. 5 shows the fuel injector 1 in an open position. The fuel injector 1 of this second embodiment is broadly the same as that of the first embodiment except in the manner of the connection of the injection valve needle 30 to the armature 4 of the actuator. While the injection valve needle 30 of FIGS. 2 and 3 was connected to the armature 4 via the first needle part 32, in FIGS. 4 and 5, it is the second needle part 34 that engages with the armature 4. Accordingly, in this embodiment, the second needle part 34 extends further into the housing 2 of the fuel injector 1 than the first needle part 32, which terminates above the sealing region 40.

The second needle part 34 is provided with a lifting collar 8 around its radially outward facing surface such that vertical movements of the lifting collar 8 and second needle part 34 are coupled. In another difference with the embodiment of FIGS. 2 and 3, the armature 4 of the second embodiment is not directly coupled to either the lifting collar 8 or the second needle part 34, but instead is separated from a lower surface of the lifting collar 8 by a pre-travel clearance 9 when the fuel injector 1 is in the closed position.

Therefore, when an electric current is passed through the solenoid 3, causing the armature 4 to move vertically upwards, the armature 4 is not immediately coupled to the lifting collar 8 and so the injection valve needle 30 is not immediately moved to the open position. Instead, the provision of the pre-travel clearance 9 means that the armature 4 is allowed to accelerate during closure of the pre-travel clearance 9 before engaging with the lifting collar 8, resulting in a faster initial movement of the first and second needle parts 32, 34 away from the upper and lower valve seats 24, 26, respectively. The moving mass of the armature 4 can then also provide an impact force that can overcome any imbalance in the seating force between the needle parts 32, 34 and their respective valve seats 24, 26. The pre-travel clearance 9 also enables oscillation or bouncing of the armature 4 to occur after an injection event without causing unwanted opening or closing of the fuel injector 1.

While this description gives exemplary embodiments of how the invention can be realised and some advantages thereof, deviations from these examples may still fall within the scope of the appended claims.

The invention claimed is:

1. An injection nozzle for an internal combustion engine, the injection nozzle comprising:

a nozzle body defining a nozzle body bore, a blind end region of which defines a set of nozzle outlets;

an injection valve needle-slidable in the nozzle body bore and engageable with a seating arrangement to control fuel flow through the set of nozzle outlets;

wherein the seating arrangement includes a seating insert received in the nozzle body bore and positioned upstream of the nozzle outlets, the seating insert defining an upper valve seat;

the injection valve needle comprising a first seating portion and a second seating portion which are axially spaced along the injection valve needle;

wherein the first seating portion is engageable with the upper valve seat defined by the seating insert;

and wherein the second seating portion is engageable with a lower valve seat defined by the nozzle body bore, and wherein the seating insert defines at least in part a first flow path for fuel to travel from the upper seating surface to the set of nozzle outlets, when the first seating portion is disengaged therefrom to commence a fuel injection event.

2. The injection nozzle of claim 1, wherein the lower valve seat is defined by a conical end surface of the nozzle body bore.

3. The injection nozzle of claim 1, wherein the lower valve seat is located below the set of nozzle outlets.

4. The injection nozzle of claim 1, wherein the flow path defined by the seating insert includes a flow channel defined between a radially inward facing surface of the seating insert and a radially outward facing surface of the injection valve needle.

5. The injection nozzle of claim 4, wherein the flow channel is annular.

6. The injection nozzle of claim 4, wherein the flow path defined by the seating insert includes one or more ducts leading from a radially inward position with respect to the seating insert to a radially outward position.

7. The injection nozzle of claim 6, wherein the one or more ducts defined by the seating insert are proximal to the set of nozzle outlets defined by the nozzle body.

8. The injection nozzle of claim 1, wherein the first seating portion of the injection valve needle is defined by a first needle part, and wherein the second seating portion of the injection valve needle is defined by a second needle part.

9. The injection nozzle of claim 8, wherein the second needle part is fixed to the first needle part.

10. The injection nozzle of claim 9, wherein the fixing between the first needle part and the second needle part is remote from the seating arrangement.

11. The injection nozzle of claim 1, wherein the injection valve needle is directly coupled to an armature of an actuator arrangement.

12. The injection nozzle of claim 1, wherein the injection valve needle is provided with a lifting collar, which is separated from an armature of an actuator engagement by a pre-travel clearance.

13. The injection nozzle of claim 1, wherein the diameter of the upper valve seat is greater than the diameter of the lower valve seat.

14. The injection nozzle of claim 1, wherein the diameters of the upper valve seat and the lower valve seat differ by at most 20%.

15. The injection nozzle of claim 1, wherein the injection valve needle defines a second flow path which permits fuel to travel inside the injection valve needle to the lower valve seat.

* * * * *